UNITED STATES PATENT OFFICE.

WILLIAM F. LADD, OF NEW YORK, N. Y., AND MORRIS L. KEEN, OF PHILADELPHIA, PA., ASSIGNEES, BY MESNE ASSIGNMENTS, OF CHAS. WATT AND HUGH BURGESS.

IMPROVED PULP FROM WOOD, &c., FOR THE MANUFACTURE OF PAPER.

Specification forming part of Letters Patent No. 11,343, dated July 18, 1854; antedated August 19, 1853; Reissue No. 608, dated October 5, 1858; Reissue No. 1,448, dated April 7, 1863.

DIVISION A.

*To all whom it may concern:*

Be it known that CHARLES WATT and HUGH BURGESS, of London, England, did invent a new and useful Improvement in the Manufacture of Paper-Pulp from Wood and other Vegetable Substance; and we do hereby declare that the following is a full, clear, and exact description thereof.

The wood or vegetable substance from which it is intended to make the pulp should first be reduced to fine shavings or cuttings. This may be done in any suitable machine. The shavings or cuttings of wood or the vegetable substances are then to be boiled in a solution of caustic alkali, in a suitable boiler, under pressure. The strength of the alkali is dependent on the nature of the vegetable substance used and operated upon. For non-resinous woods a solution of alkali of the strength indicated by 17° of the English hydrometer, or thereabout, answers very well, and for deal, pine, or fir wood, or other woods containing resinous matter, a strength of about 12° is sufficient, but varying, with the nature of the vegetable substance being acted upon, to a strength of about 10°. The varied nature of the vegetable substance to be operated upon is such that only general directions can be given for the strength of the alkali, or the degree of heat to be used, or the duration of the operation. Boiling in a solution of caustic alkali under pressure is of essential importance. By the words "under pressure" is meant a pressure at, near, or above 300° of Fahrenheit's scale, which is the ordinary pressure used; but a heat and corresponding pressure of from 300° to 500° may be used, according to the nature of the vegetable substance to be treated, whether resinous or non-resinous or otherwise, and the time may be from four to twelve hours, according to the nature of the substance. After the vegetable substance has been thus operated upon by caustic alkali under heat and pressure for the requisite time, as above described, it should be discharged from the boiler while under pressure into a tank or other reservoir with proper safety-valves and pipes for the discharge of the steam, and should be drawn, as soon as the steam shall have escaped, into open vats, where it can be operated upon in the next stage of the process; or it may be drawn directly into the vats from the boiler. The vats which receive the wood shavings or cuttings or other vegetable substances being formed into pulp should be constructed with suitable means of drainage. The alkaline solutions must then be removed from the pulp either by percolation and subsequent washing in the vats or by pressure in any convenient apparatus and subsequent washing. The mode of percolation has generally been found sufficient. The alkaline solutions thus obtained may be saved and evaporated down, and the residuum burned in a furnace suitably constructed, so as to prepare the alkaline substances for use in a repetition of the same process. The alkaline solutions having been removed by percolation and washing or by pressure and washing, the wet mass of woody or vegetable pulp is now to be exposed to the action of chlorine, or the compounds of chlorine with oxygen, for the purpose of bleaching it and preparing it for the manufacture of white paper. Brown, colored, or unbleached paper of good quality can be produced from the pulp as soon as the alkaline solutions are removed; but for the production of good white paper it is necessary to subject the pulp to the bleaching process. If the material used be wood or vegetable substance of a non-resinous nature, the pulp may be bleached by subjecting it to the action of chlorine in a gaseous form, or, which is preferable in this case, in an aqueous solution in any of the common and well-known modes. If the wood or vegetable substance be of a resinous nature, the alkaline solutions should be removed by the mode above described, and the pulpy mass should be exposed to the action of chlorine or its compounds with oxygen. This may be done by placing the pulpy mass of woody or vegetable substance on racks or drawers arranged in a chamber, and applying chlorine or its compounds with oxygen in the gaseous form, which with resinous substances is preferable to the aqueous solution, until the mass is sufficiently acted upon. The mass must then be again well washed, and treated with a weak solution of caustic alkali, (warm preferred,) which changes the red color to a dark brown. The alkaline solution should then be removed by washing, and the resulting gray pulp may be bleached by any ordinary method of bleaching.

What we claim in this patent as the invention of CHARLES WATT and HUGH BURGESS, as a new article of manufacture, is—

A pulp suitable for the manufacture of paper, made from wood or other vegetable substances by boiling the wood or other vegetable substance in an alkali under pressure, substantially as described.

WILLIAM F. LADD.
MORRIS L. KEEN.

Witnesses to W. F. Ladd:
JONATHAN S. ODELL,
SAMUEL COLES.
Witnesses to M. L. Keen:
GEO. C. WARD,
PATRICK WARD.